Feb. 21, 1928. 1,660,289
F. E. ARP
GEAR SHIFTING APPARATUS
Filed May 18, 1927 3 Sheets-Sheet 1
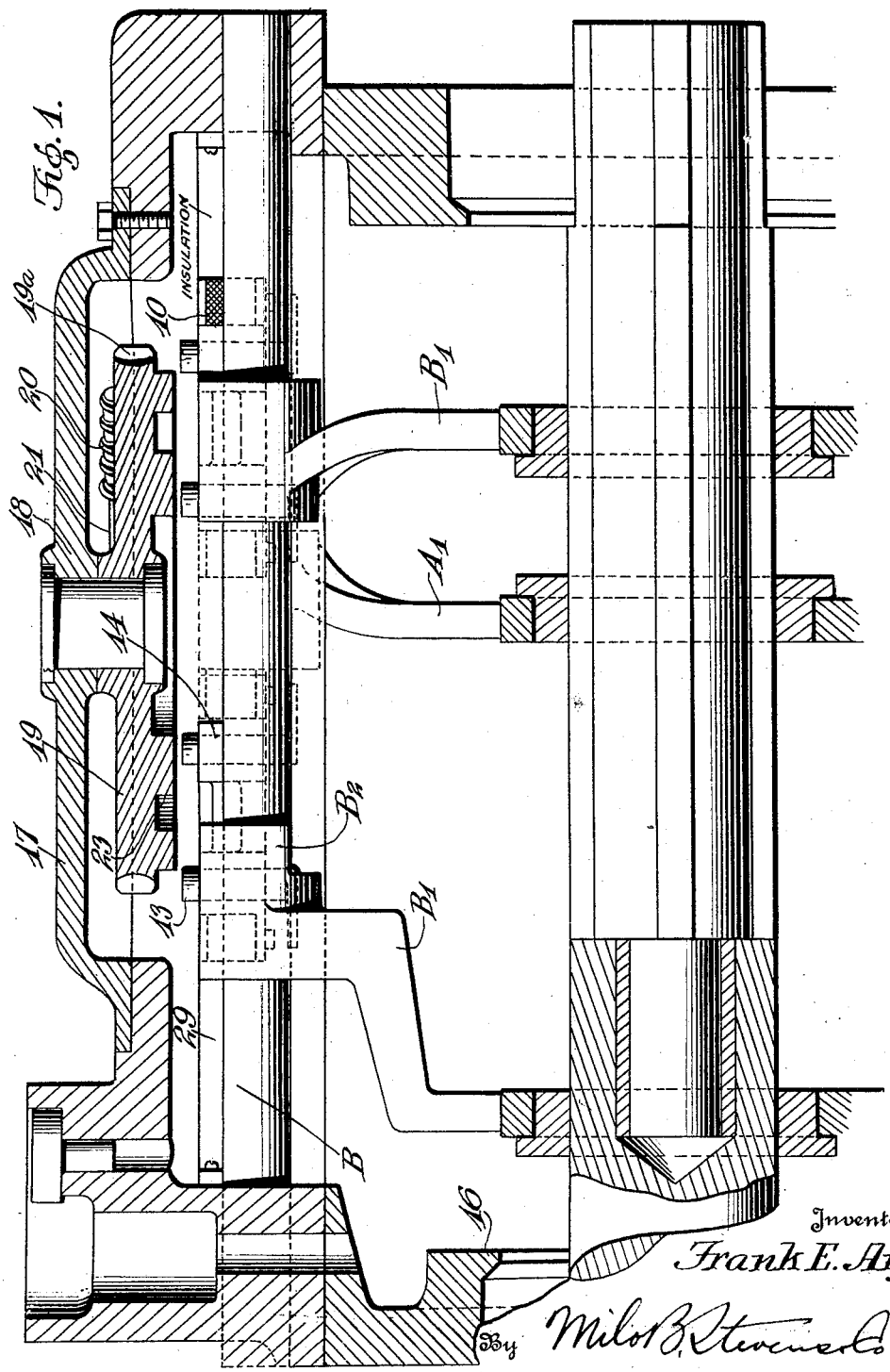
Inventor:-
Frank E. Arp
By Milo B. Stevens Co
Attorneys

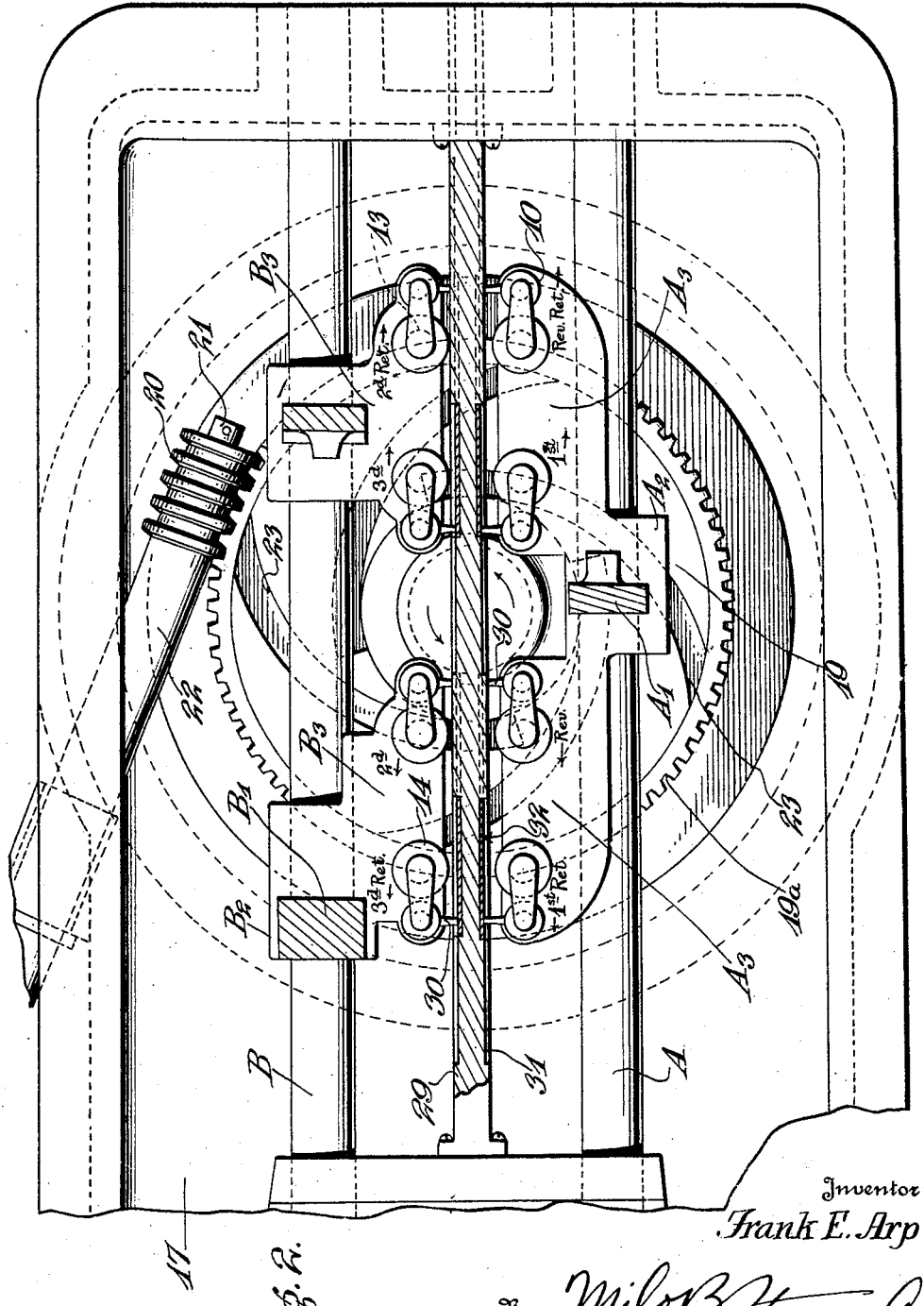

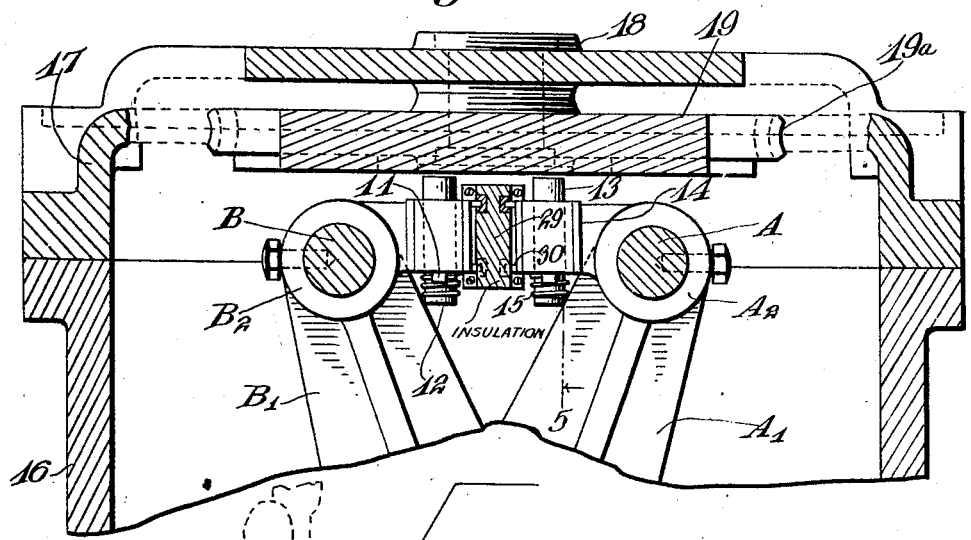
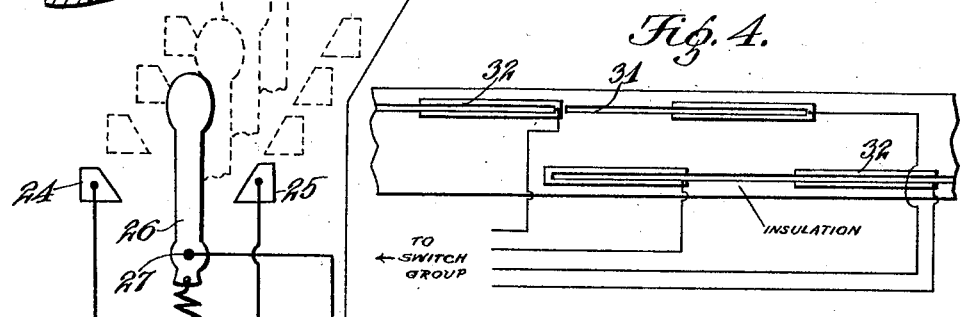
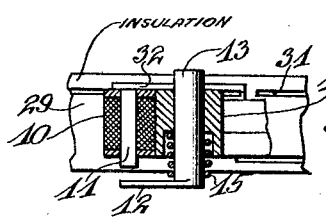
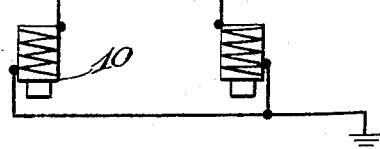

Patented Feb. 21, 1928.

1,660,289

UNITED STATES PATENT OFFICE.

FRANK E. ARP, OF CHICAGO, ILLINOIS.

GEAR-SHIFTING APPARATUS.

Application filed May 18, 1927. Serial No. 192,397.

My invention relates to gear-shifting apparatus for motor car transmissions, and more particularly to that class of gear-shifting appliances which are electrically actuated, and my main object is to provide a novel apparatus which is simple and positive in its action.

A further object of the invention is to so design the novel apparatus that it is readily cooperative with the present day transmission gearset without material alteration thereof.

A still further object of the invention is to construct the gear-shifting mechanism so compactly that it will but slightly enlarge the housing of the gearset.

Another object of the invention is to employ a power element for the shifting mechanism which is in constant motion and therefore instantly available to put in motion a selected shifting element.

A final but nevertheless important object of the invention is to design the novel apparatus with few and rugged parts, which will operate efficiently without attention.

With the above objects in view and any others that may suggest themselves from the specification and claims to follow, a better understanding of the invention may be gained by reference to the accompanying drawing, in which—

Figure 1 is a longitudinal section of the upper part of a standard transmission gearset, showing the application of the novel shifting apparatus;

Fig. 2 is a bottom plan view, showing only so much of the gearset as is necessary for the understanding of the invention;

Fig. 3 is a central cross-section of the assembly;

Fig. 4 is a face view of a fragment of a contact beam, with a diagrammatic illustration of its electrical connections;

Fig. 5 is a detail section of a magnetic unit, such as may be taken on line 5 of Figure 3; and Fig. 6 is a diagrammatic illustration of the electrical features of the arrangement.

In applying a mechanism for the shifting of gears in a transmission gearset of standard 3-speed-and-reverse design, the parts directly concerned are the longitudinally-movable rods marked A and B in the drawings. These rods carry the necessary arms $A^1$ and $B^1$ for the shifting of corresponding gears, but this invention is not concerned with these or the resulting operations in the present description, as the parts below the rods A and B and their operation are of common knowledge to those skilled in the art. For the present purpose, it will suffice to assume that rod A must be shifted to the right (see Fig. 2) to secure first speed, and to the left to secure reverse speed; and rod B must be shifted to the right to secure third speed, and to the left to secure second speed. The rods are, of course, illustrated in neutral positions.

In order that the novel shifting apparatus may act on the rods in any one of the directions mentioned, a hold is taken through the shifter arms $A^1$ and $B^1$ by forming the hubs $A^2$ and $B^2$ thereof with extensions $A^3$ and $B^3$, respectively, in an inward direction. At selected points, the extensions are fitted with magnetic units, whose peculiar function will appear in a later section.

Each of the magnetic units just referred to consists of a coil 10, a vertical core 11 therein, an armature 12 below the core, a pin 13 extended vertically from the armature, a block 14 in which the pin 13 is slidably disposed, and a spring 15 to depress the pin and maintain the armature spaced from the core under normal conditions. When the coil 10 is energized by a suitable electric circuit, the armature is attracted to the core 11, projecting the pin in an upward direction.

In adapting the standard transmission gearset to the novel shifting apparatus, the design of the housing 16 need not be altered. The cover 17 is however replaced by one in which a bearing 18 is had to journal a horizontally-disposed disk 19. The position of the latter is immediately above the array of magnetic units described above; and since the disk is intended to be in constant motion as long as the vehicle is in operation, it is preferably formed with a hob-gear periphery $19^a$, which receives a meshing pinion 20 on one end of a shaft 21. The latter is journaled in a suitable bearing 22 formed from the cover 17 and receives its motion by being extended into the flywheel housing of the engine, to make a geared connection with the flywheel or the clutch unit carried thereby. I have thought it unnecessary to illustrate the connections of the shaft 21 beyond the sphere of the transmission housing, it being sufficient to state that the shaft is engine driven and therefore in constant operation, irrespective of the functions of the clutch and gears.

The under side of the disk 19 is cut with a series of involute grooves 23 designed to operate as radial cams upon the magnet pins 13 when the latter are projected upwardly by the energizing of the corresponding magnets. The magnetic units being fundamentally fastened to the shifter-rods A, B, such units are bodily movable but longitudinally of the transmission housing; that is, the units relative to either rod move with the rod, as one, in the shifting directions first outlined. Therefore, with the disk 19 rotating in the direction of the arrows in Fig. 2, the projection of a given magnet pin 13 may cause it to fall into one of the grooves 23 and be carried radially of the disk until clear of the latter. This motion of the pin incidentally carries the corresponding rod A or B in a prescribed shifting direction.

In the shifting of gears in the standard transmission gearset, the shifting motion is either from the neutral position into a desired speed, or from a speed to the neutral position. The shifter rods A, B, are thus made to move to the right or to the left of the neutral positions shown, or to return to such neutral positions from the right or the left. Each rod is thus susceptible of two outward motions and two inward or return motions.

I aim to accomplish all the above-described motions of the shifter rods by the use of but the single, constantly rotating disk 19. My method is to use the area forward of the disk center to induce forward shifting motion, and rearward of the disk vice versa. To understand this, it must be observed that I only employ the cam-action of the disk grooves 23 outwardly, that is, with a centrifugal effect on the affected magnet pin 13. The pin must therefore be initially positioned opposite the central or inner end of any groove which it is to negotiate; and, as the grooves start at an equal distance from the center of the disk and closely follow one another, it follows that the pin will find a groove the moment it is projected.

As noted in Figure 2, each of the rods A, B, carries a magnetic unit just forward and immediately rearward of the disk center for the speed-engaging shifts, as denoted by the small arrows and familiar legends of the four speeds; and the same rods carry more distant complementary units—also suitably marked—which accomplish the return of the corresponding speeds to neutral condition precisely in the manner of the shifting units, but of course in the reverse direction due to being on the opposite side of the disk center.

For purposes of control, each speed and its complementary return are represented in a suitable switch box on the steering wheel by paired and opposed contacts 24 and 25, each of which is engageable by a switch lever 26, pivoted at 27 and normally retained in clear position by a spring 28, as per diagrammatic showing in Figure 6. As indicated by dotted lines in a perspective array, four levers are provided for the control of the respective pairs of units. As indicated in the simple circuits shown, the magnets are connected in parallel and singly energized by the movement of the selected lever 26 upon one—24—or the other—25— of its contacts. For instance, the row of contacts at the left may be termed 1st, 2d, 3d and reverse speeds, and those at the right 1st, 2d, 3d and reverse returns. Thus, to set the machine in motion the first speed contact is made for an instant and the lever released, as the gears remain in speed. To increase speed, the first return contact is made, also for an instant, and the lever released, this action having returned the first speed gears to neutral position. The second speed contact is, however, made forthwith, shifting the gears accordingly, and so on, through the series, it being understood that the driver disengages the clutch as usual each time a speed shift is actuated.

Owing to the speed of the constantly rotating disk 19, it will be seen that the time required to effect the mechanical shifting impulse will be very brief, and when the driver has mastered the handling of the switch levers, the shifting of gears will take but a moment, and the car will not lose momentum between speeds as is usually the case when shifting is done by the standard hand method.

To avert mistakes and consequent damage, a suitable device will be incorporated in the switch box to prevent more than one control from being exercised at a time. Devices of this kind have been employed in the art, and I do not consider it necesary to illustrate or describe any in the present writing.

To distribute the effect of the manual controls, a suitable beam 29 of bakelite or other hard insulating material is secured in the transmission housing, between the banks of electromagnets. Each of the latter has one end of the winding grounded and the other emerging in the form of a contact finger 30. The beam is grooved longitudinally, as indicated at 31, to accommodate the fingers 30 for their sliding actions, and the grooves are lined with contact channels 32, wired to the respective switch controls as indicated in Figures 4 and 6, to transmit current to the selected magnets. The channels 32 are of a length equal to that of a gear shifting stroke, so that the affected magnet pin 13 may remain in advanced position—and therefore seated in the disk groove 23 found by it—as long as the gear-shifting impulse prevails, assuring a complete shifting stroke. The beam grooves 31 are preferably made at two heights, each level serving to cooperate with a given shift and its return. Thus, the section in Figure 2 shows the lower grooves accommodating the contacts for the first speed and return and the third speed and return. As the grooves for the second speed and reverse are at a higher level, the positions for the fingers 30 for these speeds will correspond, so that there will be no confusion between the paths of the respective fingers. The affected magnets thus always have their fingers in the paths of their circuits.

Recurring to the constantly rotating disk 19, it will be apparent that its speed will vary, due to the everchanging speeds of the engine as the car is driven under average conditions. While this factor, evidenced by varying rapidity of the shifting actions, would occasion no harm even at excessive engine speeds, I would suggest as a modification the use of an independent operating source for the disk, such as an electric motor, whose speed is uniform. The motor could be compactly incorporated in the housing cover 17 and be wired to the engine generator or battery to operate only when the engine is running or when a special switch is closed, in case a gear change is desired when the engine is not running.

I claim:

1. In a transmission gearset, longitudinally-movable gear shifting rods, a rotatable member opposite the latter and formed with cam grooves, magnets carried by the rods, magnet armature pins movable into said cam grooves when the magnets are energized to receive impulses for the movement of said gear shifting rods, current-collecting fingers extended from said magnets, and a contact beam along which said fingers are slidable during the movement of the gear shifting rods to maintain electrical contact.

2. In a transmission gearset, longitudinally-movable gear shifting rods, a rotatable member opposite the latter and formed with cam grooves, magnets carried by the rods, magnet armature pins movable into said cam grooves when the magnets are energized to receive impulses for the movement of said gear shifting rods, current-collecting fingers extended from said magnets, and an insulation beam with contact inserts along which said fingers are slidable during the movement of the gear shifting rods to maintain electrical contact.

3. In a transmission gearset, a gear shifting rod movable longitudinally between extreme positions and an intermediate position, a rotatable member opposite the rod and having a series of involute cams about its center, and followers carried by said gear shifting rod for engagement with said cams to effect the movement of said gear shifting rod between the positions referred to, the followers being placed to engage the cams at their source and be projected thereby in a direction radial of said rotatable member.

4. In a transmission gearset, a gear shifting rod movable longitudinally between extreme positions and an intermediate position, a rotatable member opposite the rod and having a series of involute cams about its center, and spaced pairs of followers carried by said gear shifting rod for selective engagement with said cams to effect the movement of said gear shifting rod between corresponding ones of the positions referred to, the followers being placed to engage the cams at their source and on opposite sides of the center of said rotatable member.

5. In a transmission gearset, a gear shifting element movable in a predetermined path, a rotatable member opposite the latter and formed with a cam, followers carried by the gear shifting element and selectively movable into the path of said cam, whereby the latter may induce the movement of said gear shifting element, and said followers being relatively positioned so that one will be moved toward the source of said cam as the other follower is actuated by the cam toward the remote end thereof whereby the second follower may be engaged with the cam to return the first follower to its starting position.

6. In a transmission gearset, a gear shifting element movable in a predetermined path, a rotatable member opposite the latter and having its opposed surface formed with a plurality of involute cams, followers carried by the gear shifting element and selectively movable into the path of said cams to receive impulses for the movement of said gear shifting element, and said followers being relatively positioned so that one will be moved toward the source of said cams as the other is actuated by the cams toward the remote end thereof.

7. In a transmission gearset, a gear shifting element movable in a predetermined path, a rotatable member opposite the latter, a cam formed upon the face of said rotatable member, magnets carried by the gear shifting element, transversely bored blocks adjacent the respective magnets, a pin working in the bore of each block and having a lateral portion adapted to be attracted by its magnet to project the pin into the path of said cam when the respective magnets are energized to receive impulses for the movement of said gear shifting element.

8. In a transmission gearset, a gear shifting element movable in a predetermined path, a rotatable member opposite the latter and formed with a cam, a magnet carried by the gear shifting element, a stud actuated by said magnet and movable into the path of said cam when the magnet is energized to receive an impulse for the movement of said gear shifting element, a current-collecting finger extended from said magnet, and a contact beam along which said finger is slidable during the movement of the gear shifting element to maintain electrical contact.

9. In a transmission gearset, a gear shifting element movable in a predetermined path, a rotatable member opposite the latter and formed with a cam, a magnet carried by the gear shifting element, a stud actuated by said magnet and movable into the path of said cam when the magnet is energized to receive an impulse for the movement of said gear shifting element, a current-collecting finger extended from said magnet, and an insulation beam with contact inserts along which said finger is slidable during the movement of said gear shifting element to maintain electrical contact.

In testimony whereof I affix my signature.

FRANK E. ARP.